(No Model.)
H. F. HARVEY.
DENTAL OBTUNDER.
No. 571,970. Patented Nov. 24, 1896.
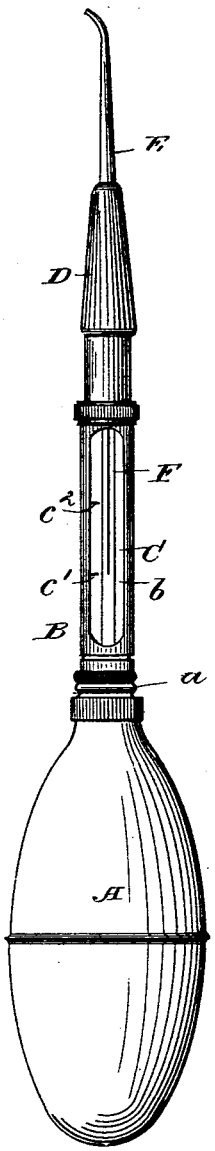
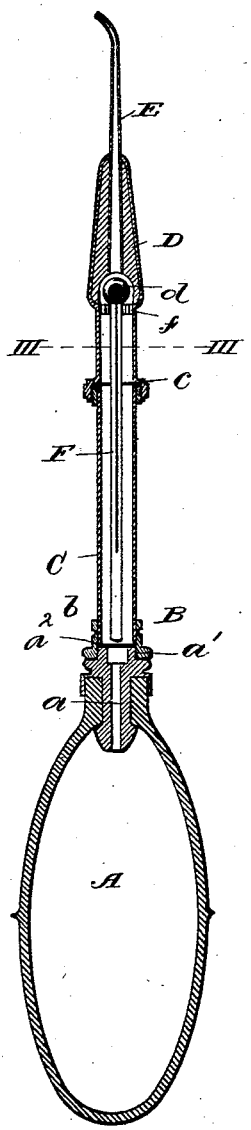
WITNESSES:
INVENTOR:

UNITED STATES PATENT OFFICE.

HERBERT F. HARVEY, OF CLEVELAND, OHIO.

DENTAL OBTUNDER.

SPECIFICATION forming part of Letters Patent No. 571,970, dated November 24, 1896.

Application filed December 21, 1895. Serial No. 572,837. (No model.)

*To all whom it may concern:*

Be it known that I, HERBERT F. HARVEY, a citizen of the United States, and a resident of Cleveland, county of Cuyahoga, and State of Ohio, have invented certain new and useful Improvements in Dental Obtunders, of which the following is a specification, the principle of the invention being herein explained and the best mode in which I have contemplated applying that principle, so as to distinguish it from other inventions.

The annexed drawings and the following description set forth in detail one mechanical form embodying the invention, such detail construction being but one of various mechanical forms in which the principle of the invention may be used.

In said annexed drawings, Figure I represents a side view of my improved dental obtunder; Fig. II, a longitudinal section of the same; and Fig. III, a transverse section on the line III III in Fig. II, said section being illustrated on an enlarged scale.

The object of my invention is to provide a dental obtunder with means for enabling the operator to apply an air-blast of known and of constant temperature according to the circumstances and conditions prevailing during the operation.

The device has a force-bulb A, of rubber or similar flexible and expansible material, and said bulb is closed at all sides, excepting at one end, where a tubular coupling $a$ is secured, such coupling having an externally-screw-threaded portion $a'$, which screws into one end of a tubular casing B. Said casing is cut away at one side for nearly the length of the casing to form an opening $b$, which opening exposes one side of a glass tube C, which fits within the casing. A gasket-packing $a^2$ is placed between the end of the glass tube and the end of the coupling, so as to form an air-tight joint. The open tubular casing is screwed into the neck of a bulb D, preferably of copper or other metal which will retain its heat for a considerable space of time, and a gasket-packing $c$ is placed between the end of the glass tube and a shoulder within the neck of the bulb, so as to form an air-tight joint. A nozzle E projects from the end of the heating-bulb, and is preferably curved, so as to properly direct the blast from the blower into the tooth-cavity. A thermometer F is placed within the glass tube and heating-bulb, and has its bulb within a cavity $d$ within the heating-bulb and its stem within the glass tube, so that the mercury column of the thermometer may be observed through the slot of the casing and the glass tube. The stem of the thermometer is encircled by a guide $f$, which is preferably formed by a flat helical spring which will center and retain the thermometer and will not obstruct the free flow of air into and from the elastic blower-bulb A. Suitable maximum and minimum marks $c'$ and $c^2$ are marked upon the glass tube, so that the predetermined degrees of heat to which the air is heated for certain uses may be conveniently read.

The two principal uses to which the instrument is destined are as a chip-blower and as a hot-air syringe. When used as a chip-blower for the purpose of removing chips and dust from a tooth-cavity formed by the dental drill or other dental instrument, the temperature of the air blown into the tooth-cavity is required to be only sufficient to not chill the exposed surfaces. As the heating-bulb is heated in the spirit or other flame, the proper temperature may be read by the mercury column reaching the minimum mark upon the glass tube. When a hot-air blast is required for obtunding sensitive dentine, the heating-bulb is heated to such temperature that the mercury column reaches the maximum mark upon the glass tube. By means of the thermometer an exact temperature may be maintained for the blast, whatever degree such temperature may be required to have.

Other modes of applying the principle of my invention may be employed for the mode herein explained. Change may therefore be made as regards the mechanism thus disclosed, provided the principles of construction set forth respectively in the following claims are employed.

I therefore particularly point out and distinctly claim as my invention—

1. The combination with a dental blower having a transparent portion in its air-duct and suitable predetermined marks upon such portion, of a thermometer having its stem beneath said transparent portion and its mercury column registering with the marks on the latter, substantially as set forth.

2. In a dental blower, the combination of a force-bulb, a longitudinally-slotted casing, a glass tube within said casing and forming the air-duct for the bulb, a heating-bulb at the other end of the casing and glass tube, a nozzle extending from said heating-bulb, a thermometer having its bulb within the heating-bulb and its stem in the glass tube, and a guide surrounding the thermometer and holding it from contact with the sides of the air-duct, substantially as set forth.

In testimony that I claim the foregoing to be my invention I have hereunto set my hand this 18th day of December, A. D. 1895.

H. F. HARVEY.

Witnesses:
WM. SECHER,
DAVID T. DAVIES.